Patented Feb. 9, 1932

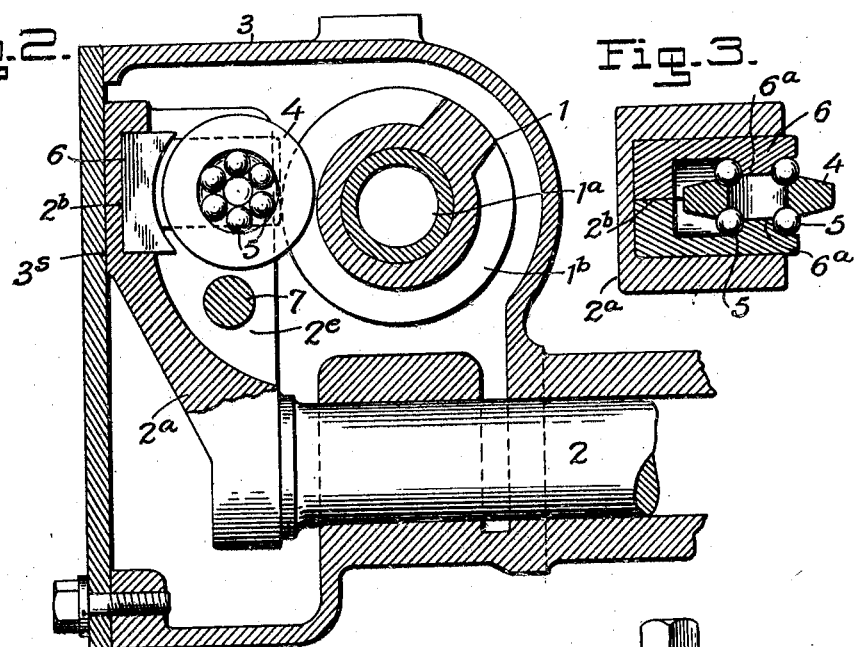
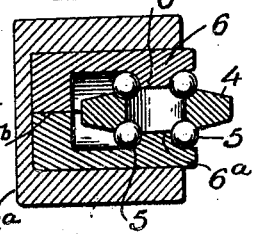
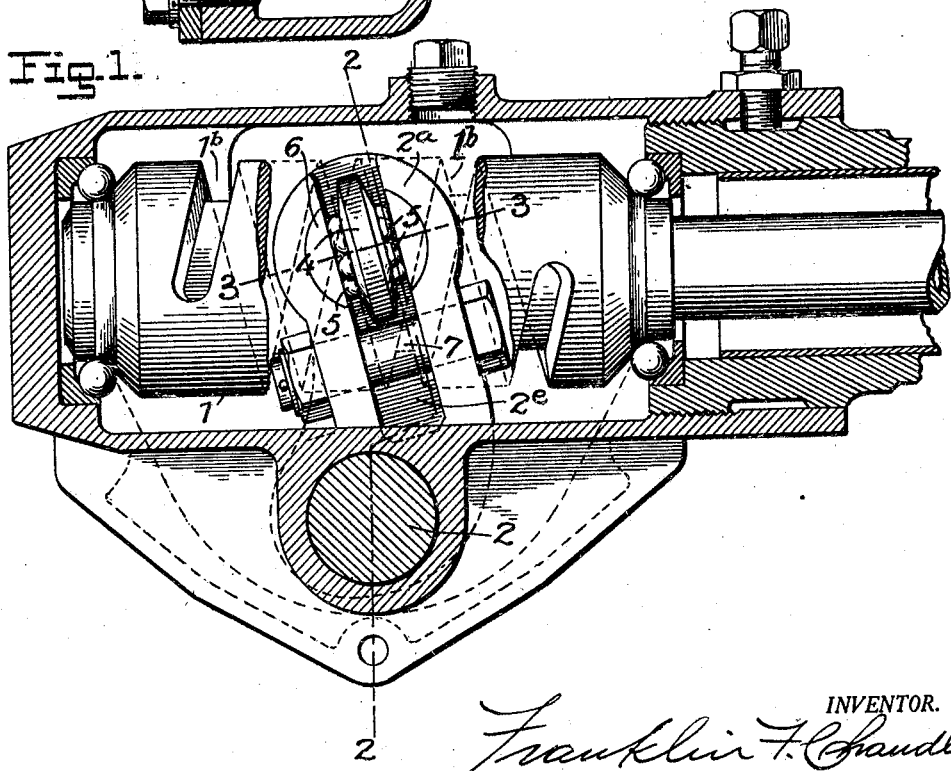

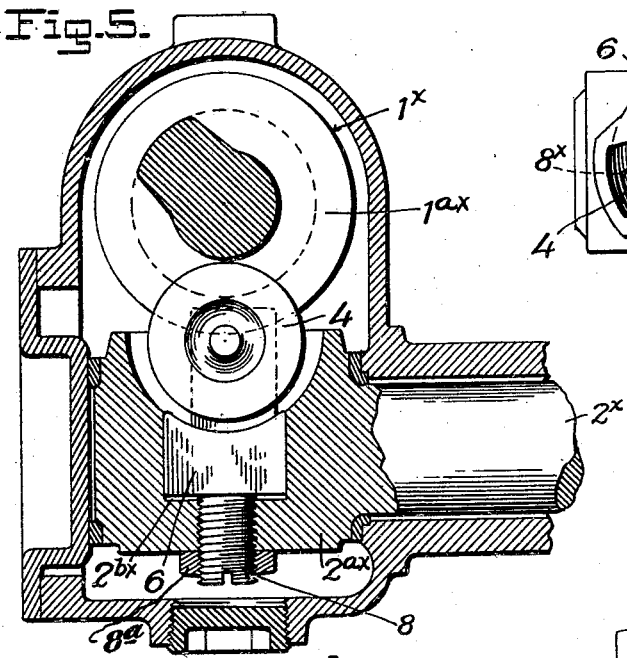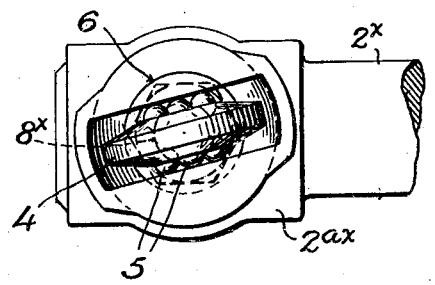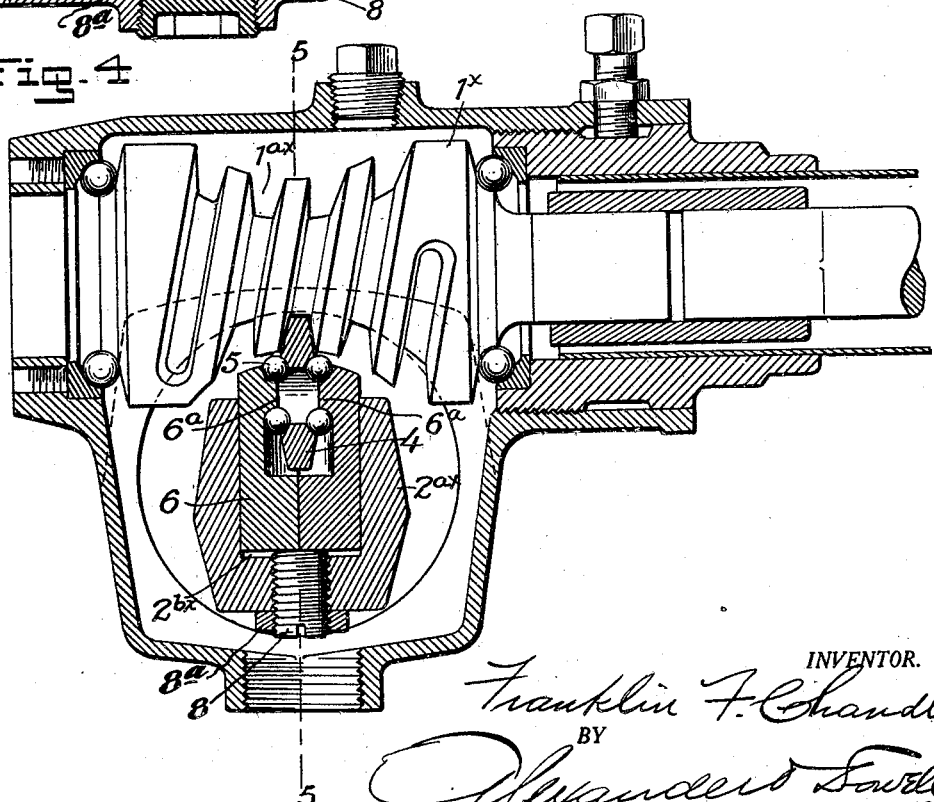

1,844,005

UNITED STATES PATENT OFFICE

FRANKLIN F. CHANDLER, OF LA FAYETTE, INDIANA, ASSIGNOR TO ROSS GEAR & TOOL CO., OF LA FAYETTE, INDIANA, A CORPORATION OF INDIANA

STEERING GEAR

Application filed October 8, 1928. Serial No. 311,093.

This invention is an improvement in steering gears for automobiles and the like and has particular reference to the so-called cam and lever steering gear of the type shown in patent to D. E. Ross No. 1,567,997, December 29th, 1925, but is also applicable to other types of steering gear having a helical or spirally grooved actuating member adapted to be engaged by a member on the rocker shaft so as to transmit motion from the actuating member to the rocker shaft.

The object of the present invention is to improve such gears by providing a novel anti-friction rolling contact between the walls of the helical groove of the actuating member and the member on the rocker arm, to provide such a contact as will accommodate iteslf to and maintain rolling contact with a helical groove of varying pitch.

I will explain the invention with reference to the accompanying drawings in which I have illustrated two well known types of steering gears to which the invention is applied—as illustrative of the utility and application of the invention to various forms of gears; and will explain the invention with reference to said drawings to enable others to adopt and use the same. In the claims the essentials of the invention, novel features of construction and novel combinations of parts for which protection is desired are summarized.

In said drawings;

Fig. 1 is a section of a Ross cam and lever steering gear equipped with my invention.

Fig. 2 is a section on the line 2—2 Fig. 1 with the actuating member partly broken away.

Fig. 3 is an enlarged detail section on the line 3—3 Fig. 1.

Fig. 4 is a sectional view of part of another type of steering gear having a helically grooved actuating member and equipped with my invention.

Fig. 5 is a side view partly in section on the line 5—5 Fig. 4.

Fig. 6 is an enlarged detail plan view of the device mounted on the rocker shaft arm.

The steering gear shown in Figs. 1 to 3 has an actuating member 1 attached to a shaft 1a and having a helical groove 1b. The rocker shaft 2 has an arm 2a which is adapted to be operatively engaged with and actuated by the member 1. These parts are mounted and housed within a suitable casing 3, and in general may be constructed and adapted to operate as more fully described in the aforesaid Ross Patent No. 1,567,997.

In the Ross patent referred to the rocker arm 2a has a stud which engages the groove 1b; but in accordance with my invention instead of such pin I provide a disk like roller 4 which is rotatably mounted by ball bearings or races 5 (see Fig. 3) in a cylindric stud-journal 6 which is mounted within a socket 2b in the arm 2a of the rocker shaft directly opposite the actuating member. The parts are so proportioned that one side of the roller 4 projects into and engages the groove 1b in the actuating member 1. The side walls of this roller 4 are tapered adjacent its periphery to correspond with the taper of the opposed walls of the helical groove in the actuating member; so that the projecting portion of the roller will closely and neatly engage with said groove similar to a tooth or to the Ross stud. The roller 4 being mounted in ball bearings is free to rotate and thus friction at the contact points between the actuating member and the arm 2a is obviated.

It will be observed that this roller 4 is mounted on ball bearings at either side so that the roller is free to turn while it contacts with the actuating member and it can rotate as the member is turned.

It is desirable to mount this roller 4 and its bearings in such manner on the rocker arm 2a that the roller can contact with and accommodate itself to a helical groove 1b of varying pitch, so that the sides of the roller can not be cramped in the cam groove at the points where the pitch of the cam groove commences to change or vary. For this purpose the roller 4 and its ball bearings 5 are mounted in a slot in one end of the cylindric stud 6, which is rotatable in the socket 2b in the rocker arm 2a. This makes it possible for the roller 4 to swivel on the rocker arm 2a and readily accommodate itself to such variations in the pitch of the groove 1b as may be cut in it.

It has heretofore been thought that the only kind of a contact surface which could be successfully made with actuating members of the Ross cam and lever gears was by a conical headed stud because such stud would always make proper contact with the wall of the groove notwithstanding variations in the pitch thereof; but my invention produces a roller contact in the manner above described.

For convenience in assembling the parts the stud journal 6 may be made in diametrically opposite halves (see Fig. 3) one half of the slot and one of the bearings 6a for the ball races 5 being made in each half. In assembling the parts the ball races 5 can be placed on opposite sides of the roller 4 and the opposite halves of the stud journal 6 placed thereagainst, then the stud journal 6 can be inserted in the socket 2b.

The arm 2a preferably is slotted as at 2e which slot intersects the socket 2b; a clamp bolt 7 transfixes the opposite walls of the slot 2e between the socket 2b and the shaft 2; and after the stud journal 6 is inserted in its cavity in the outer end of the arm the clamp bolt 7 is drawn up tight enough to produce a close fit of the stud journal 6 in its socket and still permit it to readily turn on its axis so that the roller 4 will always maintain proper contact with the walls of the groove 1b.

To prevent the roller from being thrown out of mesh with the groove under violent strains, the rocker arm has a close sliding contact with the wall of the casing as shown at 3s.

In Figs. 4 to 6 the invention is illustrated as applied to a steering gear having a concaved-cylindric actuating member 1x provided with a helical groove 1ax, which is engaged by a roller 4 supported by roller bearings 5 in a stud-journal 6 as described. In this construction the stud journal 6 is mounted in a socket 2bx in an arm 2ax on the rocker shaft 2x. In this construction when the actuating member 1x is turned it will through roller 4 move arm 2ax and impart a rocking movement to the shaft 2x.

The stud journal 6 can rotate about its axis in its socket in the arm 2ax and permit roller 4 to accommodate itself to variations in the pitch of the spiral groove 1ax as above described.

To regulate and adjust the engagement of the roller 4 with the groove 1ax and to arrest and compensate for the thrust caused between the roller and the actuating member, the stud-journal 6 may be adjusted longitudinally of the socket 2bx by means of a bolt 8 tapped through a socket tapped through the arm 2ax at the inner end of the socket 2bx; said screw being provided with a locking nut 8a.

It should be observed that in the latter construction, just as with the first one described, the swiveling action of the circular stud journal 6 with the roller mounted in one end of it will permit the roller to assume various angular positions so that proper contact will be made with the groove cut in the cam even if this groove has a varying pitch.

It will be observed that the axis of the roller 4 is practically parallel with the axis of the actuating member and at right angles to the side walls of the spiral groove with which such roller engages. Also that the axis of the roller 4 is practically perpendicular to the axis of the stud 6 on which it rotates and also perpendicular to the axis of the rocker shaft on which it is mounted. Therefore the anti-friction roller in my invention is essentially different from the rollers commonly used on pins or studs to make contact with an opposed surface, the axes of such rollers being concentric to the axes of the studs upon which they are mounted.

I do not consider the invention limited in its application to the two specific types of steering gears illustrated in the drawings; as it may obviously be applied to various other types of steering gears and for other purposes in the art where a rolling contact is desirable between a spirally grooved member and a member to be operated thereby. Nor do I consider the invention limited to the specific mounting of such roller on a stud journal as illustrated.

I claim:

1. In a steering gear of the character specified including a spirally grooved actuating member, and a rocker shaft disposed at approximately right angles to the actuating member and having an arm adjacent the actuating member and adapted to be operated thereby; a stud rotatably mounted upon said arm, a roller disk rotatably mounted on said stud, the axis of the disk being substantially perpendicular to the axis of the stud and substantially parallel to the axis of the actuating member; said disk projecting beyond the stud journal and engaging the groove in the actuating member.

2. In a steering gear of the character specified including a spirally grooved actuating member, and a rocker shaft disposed at approximately right angles to the actuating member and having an arm adjacent the actuating member adapted to be operated thereby; a slotted stud rotatably mounted on said arm; a roller disk rotatably mounted in the slot in said stud, the axis of the disk being perpendicular to the axis of the stud and substantially parallel to the axis of the actuating member, said disk projecting beyond the slot in said stud and entering the groove in the actuating member.

3. In a steering gear of the character specified; a stud adapted to be rotatably mounted in a support, a roller disk rotatably mounted upon said stud, the axis of the disk being perpendicular to the axis of the stud, said disk projecting beyond the stud for engagement with an opposed groove.

4. In a steering gear of the character specified, a slotted stud rotatably mounted in a support, a roller-disk rotatably mounted in the slot in said stud, the axis of the disk being perpendicular to the axis of the stud, said disk projecting beyond the slot in said stud and adapted to enter a groove.

5. In a steering gear of the character specified; a stud journal adapted to be rotatably mounted in a socket and divided longitudinally, a roller disk rotatably mounted between members of said stud and having its periphery beveled to engage a groove; the axis of the disk being perpendicular to the axis of the stud, said disk projecting beyond the stud.

6. In a steering gear of the character specified; a stud journal adapted to be rotatably mounted in a socket and having a longitudinal slot and divided longitudinally of the slot, a roller disk rotatably mounted on ball bearings within the slot, the axis of the disk being perpendicular to the axis of the stud, said disk projecting beyond the slot.

7. In a steering gear of the character specified; a stud journal adapted to be rotatably mounted in a socket and having a slot and divided longitudinally of the slot, a roller disk rotatably mounted on ball bearings upon said stud and within the slot and having its periphery beveled to engage a groove, the axis of the disk being perpendicular to the axis of the stud, said disk projecting beyond the slot.

8. A steering gear including an actuating member provided with a helical groove, a rocker shaft having its axis in a plane perpendicular to the axis of the actuating member, and an arm on said shaft adapted to be operated by said actuating member; a support rotatably mounted on the rocker arm, and a roller disk rotatably mounted on said support; the plane of the disk being substantially parallel with the plane of the axis of the actuating member and substantially perpendicular to the axis of said support, and the periphery of said disk engaging the groove in the actuating member and providing a rolling contact between the rocker arm and the actuating member.

FRANKLIN F. CHANDLER.